Feb. 19, 1952 H. OLSEN 2,586,176
LINKED SLIDE CARRIER
Filed March 11, 1950 2 SHEETS—SHEET 1

INVENTOR
HARTVIG OLSEN
BY
ATTORNEY

Feb. 19, 1952    H. OLSEN    2,586,176
LINKED SLIDE CARRIER
Filed March 11, 1950    2 SHEETS—SHEET 2

INVENTOR
HARTVIG OLSEN
BY
Joseph Montgomery
ATTORNEY

Patented Feb. 19, 1952

2,586,176

UNITED STATES PATENT OFFICE 2,586,176

LINKED SLIDE CARRIER

Hartvig Olsen, Brooklyn, N. Y.

Application March 11, 1950, Serial No. 149,100

15 Claims. (Cl. 40—152)

1

This invention relates generally to supporting members or frames for transparent slides to facilitate the handling and transporting thereof and to insure the feeding of the slides or transparencies in proper sequence through a stereoptican machine or other form of projector. More specifically, this invention relates to linked together, easily separable, frames for receiving the slides or transparencies.

Slide carriers have been proposed which consist of hinged together slide receiving frames. In these devices, the frames were formed with hinge barrels along the leading and trailing edges thereof and adjacent frames were joined together by hinge pins, or pintles, which if easily removable were subject also to inadvertent release.

An object of this invention is to provide improved linked together slide carrying frames which are separable only upon removal of the slide or transparency from the frame.

Another object of this invention is to provide an improved connection between adjacent frames of a slide carrier which connection permits the folding of the linked together frames upon each other to provide for compact storage.

Still another object of this invention is to provide a slide receiving frame having link receiving members on the opposte ends thereof; in which the frames are so constructed as to prevent removal of the links from the link receiving members so long as a slide or transparency is disposed in the frame.

A further object of this invention is to provide a slide carrier including slide receiving frames formed with resilient link receiving members on the opposite ends, which resilient members engage under the slide or transparency to frictionally hold the latter in place, and spring to link releasing position upon removal of the slide from the frame.

According to another feature of this invention, each slide receiving frame is formed of a pair of identical reversed superposed members which are held together by the slide or transparency disposed therebetween, and form link receiving channels at the opposite ends. Removal of the slide from the frame, permits separation of the pairs of members and release of the connecting links.

According to still another feature of the invention, each of the slide receiving frames is formed of a single blank of material bent along central fold line to provide spaced apart apertured plates for receiving the slide therebetween, and the plates are provided with an interengaging assembly on the separable ends thereof which, in conjunction with the slide, lock the plates together and prevent removal of the connecting link also engaging in that assembly.

Other objects and advantages of the invention will appear from the detailed description and accompanying drawings of illustrative embodiments thereof.

Figure 1:
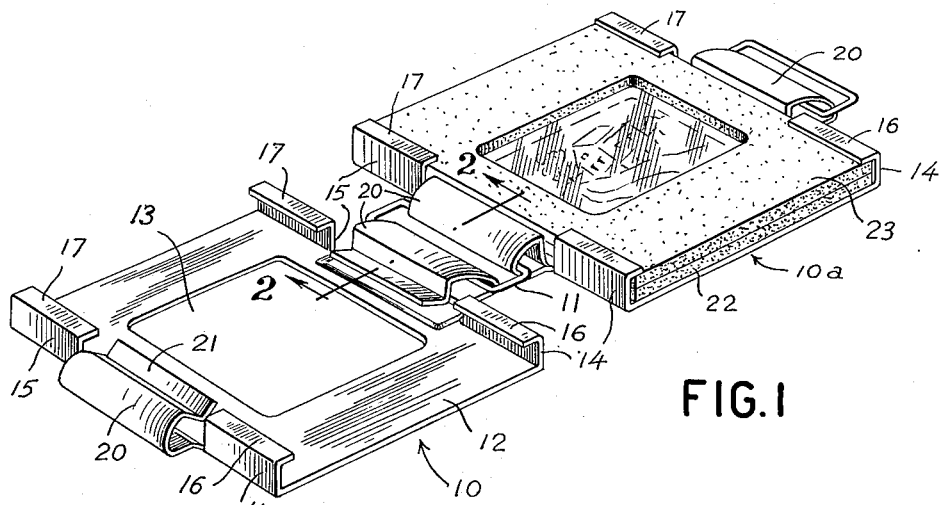
Figure 1 is a perspective view of a pair of frames for receiving slides or transparencies constructed according to a preferred embodiment of this invention.
Figure 2:
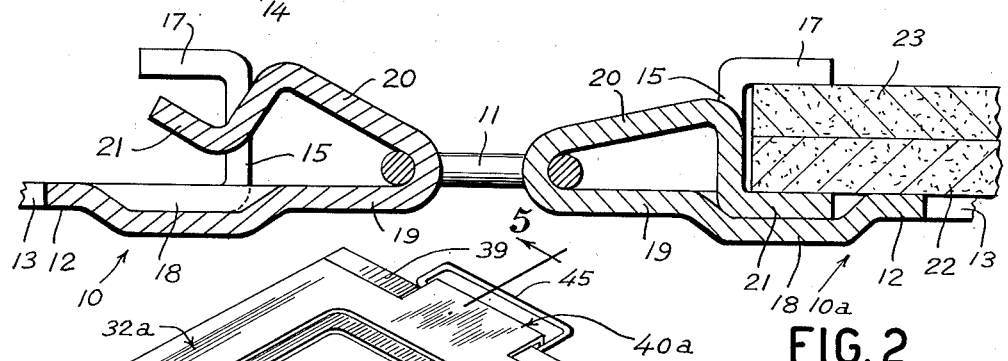
Figure 2 is a fragmentary enlarged sectional view taken along the line 2—2 of Figure 1.

Referring to the drawing, and initially to Figures 1 and 2 thereof, the numerals 10 and 10a refer generally to a pair of slide receiving frames constructed according to one embodiment of this invention. The frames 10 and 10a are identical in construction and are joined together by the closed link 11. Referring to the frame 10, from which the slide or transparency has been removed, it will be seen that the frame is formed of a substantially quadrilateral plate 12 having a sight opening 13 formed therein, which may be rectangular or otherwise to provide for the exposure of the slide or transparency. The plate is preferably formed of a metal having some resiliency, however other suitable materials could be used.

Upstanding abreviated flanges 14 and 15 are formed along spaced apart portions of the opposite end edges of the plate 12, and the top edges of the flanges 14 and 15 are bent inwardly to form the overhanging portions 16 and 17.

The overhanging portions 16 and 17 and the plate 12 cooperate to provide channels for slidably receiving the end edges of the slides or transparencies. The portions of the plate disposed between the flanges 14 and 15 are dished downwardly to provide a recess 18, and the end edges between the flanges 14 and 15 are extended coplanar with the plate 12 to provide the outwardly extending tab 19. The end of tab 19 is formed integral with a reverted extension 20, having a downwardly offset free end portion 21 constituting a locking tab. As seen in Figure 2, the extension 20 normally assumes an acute angled relationship to the tab 19, and in such normal position, the end portion or locking tab 21 is raised from the recess 18 of the plate. The tab 19, extension 20 and offset portion 21 provide a link retainer in which the link 11 may engage. When the offset end 21 is raised clear of the plate by the resilience of the material from which the members 19 and 20 are formed, the link 11 may be removed from between the members 19 and 20.

The frame 10a, having the structure recited above, is shown with a slide or transparency 22 and a superposed mounting plate or matting 23, which may be formed of cardboard, metal or other suitable material, disposed therein. The slide 22 and matting board 23 are slidably engaged between the flanges through the open side edges of the frame. The overhanging members 16 and 17 retain the slide 22 in contact with the plate 12. The offset end portion 21 of the link retainer, in its raised position obstructs the travel of the slide, and therefore, pressure is applied to the resilient extension 20 to urge the portion or locking tab 21 into the recess 18, in which position the upper surface of the portion 21 is flush with the surface of the plate 12. With the portion or locking tab 21 received in the recess 18, the link 11 is locked between the members 19 and 20. The link can only be removed by withdrawing the slide from the frame to permit the extension 20 to spring away from the tab 19 and provide clearance between the end portion 21 and the plate 12. Since the end portion 21 is constantly resiliently urged upwardly against the lower surface of the slide 23, this pressure will frictionally hold the slide and matting within the frame and prevent the inadvertent removal thereof.

Figure 3:
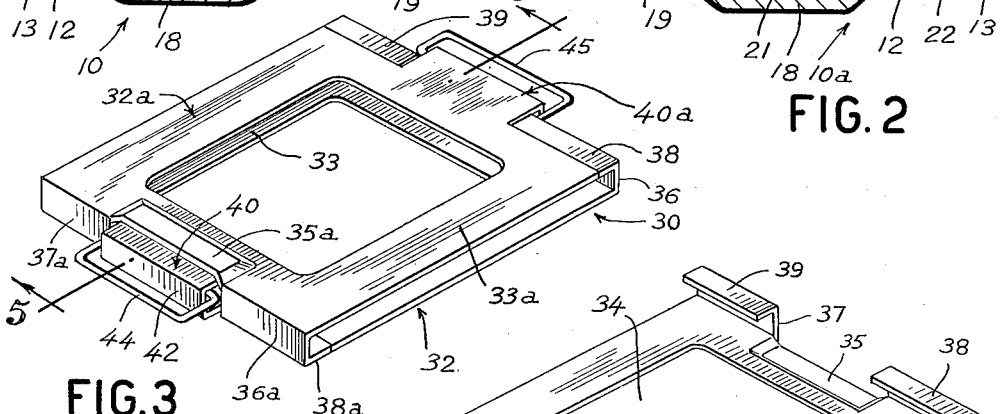
Figure 3 is a perspective view of an assembled slide receiving frame constructed according to another embodiment of the invention.
Figure 4:
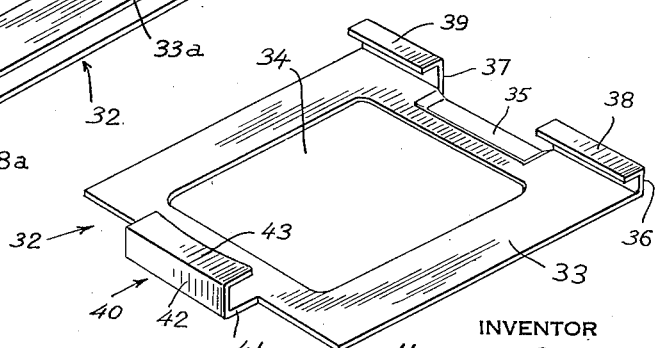
Figure 4 is a perspective view of one of the portions making up the assembled frame of Figure 3.
Figure 5:
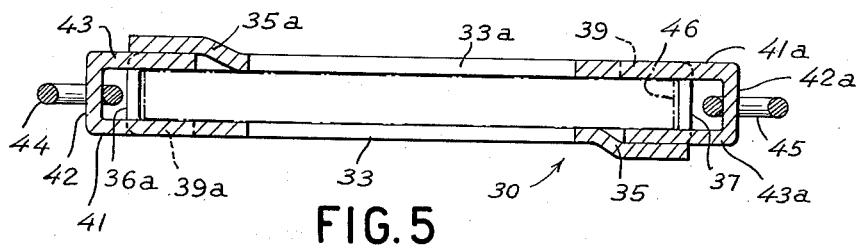
Figure 5 is a longitudinal enlarged section taken on the line 5—5 of Figure 3.

In Figures 3, 4 and 5 a modified frame is shown. The modified frame 30 is formed of a pair of identical members 32 and 32a, shown in assembled relationship in Figure 3. The details of construction of member 32 formed preferably of a resilient material are seen in Figure 4. Member 32 includes a substantially quadrilateral plate 33 formed with a central opening 34. The plate 33 is formed with a depression or recess 35 opening along one end edge thereof. Flange portions 36 and 37 extend right angularly from that one edge of the plate on each side of the recess 35. The free ends of the flanges 36 and 37 are bent inwardly to provide the overlying portions 38 and 39. A U-shaped channel 40, opening in the direction of the plate, extends from the opposite end edge of the plate 33. The channel 40 is coextensive with the length of the recess 35, and is aligned with the latter. The channel 40 includes the web 41 formed integral and coplanar with the plate 33, the flange 42 extending right angularly from the outer edge of the web 41, and the web or locking tab 43 extending inwardly from the flange 42 in spaced relation to web 41. As seen in Figure 4, the web or locking tab 43 is laterally bowed towards the web 41 and extends inwardly over the plate 33.

In assembling the frame 30, the links 44 and 45 are engaged respectively in the channels 40 and 40a of the members 32 and 32a. Member 32a is then inverted and reversed with respect to member 32 and superposed upon the latter. The web or locking tab 43 then engages in the recess 35a, while web or locking tab 43a of channel 40a engages in the recess 35. When the slide 46, shown in broken lines in Figure 5, is slid between the plates 33 and 33a, one end portion engages between the locking tab 43 of channel 40 on member 32, and the inwardly bent portions 38a and 39a of member 32a, and the other end of the slide engages between the locking tab 43a of member 32a and the inwardly bent portions 38 and 39 of member 32. The slide 46, when so positioned, will prevent the separation of the members 32 and 32a and thereby prevent removal of the links 44 and 45 from the retaining channels 40 and 40a, respectively. Furthermore, the bowed webs or tabs 43 and 43a will frictionally engage the slide and prevent the inadvertent removal of the latter from the frame.

Figure 6:
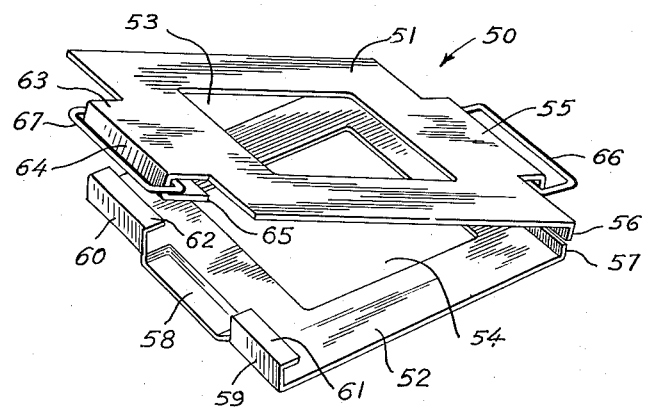
Figure 6 is a perspective view of a slide receiving frame constructed according to still another modification of the invention, with the frame shown in the open or link releasing position thereof.
Figure 7:
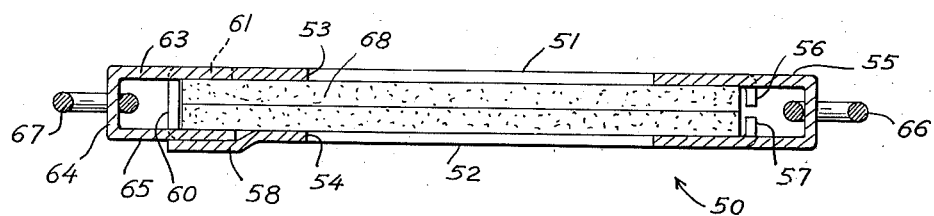
Figure 7 is a longitudinal enlarged section of the frame illustrated in Figure 6, with a slide positioned in the frame and locking the connecting links in their receptacles.
Figure 8:
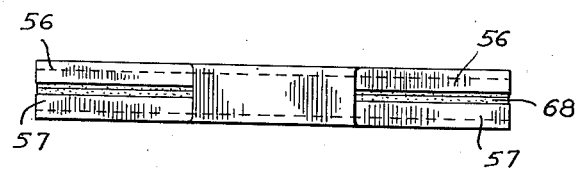
Figure 8 is an end elevation of the frame of Figures 6 and 7 in closed position.

In Figures 6 and 7 I have illustrated still another modification of a slide receiving frame constructed according to this invention. The frame 50 constructed according to this modification is formed of a single blank of resilient, preferably metallic material. The frame 50 includes the pair of substantially quadrilateral plates 51 and 52 having the mating openings 53 and 54 formed therein, respectively. Adjacent ones of the end edges, the plates 51 and 52 are joined together by the channel 55 formed integrally with the central portions of these edges of the plates. The channel 55 is so formed as to resiliently urge the plates 51 and 52 to the acutely angled relationship in which they are shown in Figure 6. The edges of the plates 51 and 52 on the sides of the channel are bent towards each other as at 56 and 57, respectively.

The other end edge of the plate 52 is formed with a dished central portion providing the recess 58. On either side of the recess 58, right angular flanges 59 and 60 extend from the end edge. The top portions of the flanges 59 and 60 are bent inwardly to form the overhanging portions 61 and 62, respectively. The central portion of end edge of the plate 51 removed from the connecting channel 55, is formed with an integral extention 63 having a right angle flange 64 on the end thereof. An inwardly bent portion or locking tab 65 is formed integral with the edge of the flange 64, and is disposed in the recess 58 of plate 52 when the plates are in parallel relation.

A connecting link 66 is unremovably engaged with the channel 55, while the link 67 which engages between the extension 63 and portion 65 of the plate 51 is locked relative to the frame only when the locking tab 65 is received in the recess 58, and the link 67 may be removed when the plates are separated as shown in Figure 6.

The plates 51 and 52 are locked together by sliding a transparency or slide 68 therebetween while pressing the plates together. The slide 68 then engages between the tab 65 of plate 51 and the overhanging portions 61 and 62 of plate 52 and prevents the separation of the plates, thus locking the link 67 to the frame. It will also be noted that the spring action of the connecting channel 55 urging the plates apart will effect the frictional engagement of the tab 65, and overhanging portions 61, 62 with the slide 68 thus preventing inadvertent removal of the slide from the frame.

The detailed description and drawings are merely illustrative embodiments of my invention, and it will be apparent that changes in the construction thereof may be effected by those skilled in the art without departing from the scope of the appended claims.

I claim:

1. In a slide carrier having a plurality of frames linked together in end to end relationship; a frame comprising a plate having a sight opening formed therein; inwardly opening channels extending along portions of the opposite end edges of said plate for slidably receiving the end edges of a slide; and link retainers extending from the opposite ends of said frame and adapted to engage connecting links, each of said link retainers including a resilient split substantially tubular member having one edge of the split formed integral with the end edge of the plate, and a locking tab extending from the other edge of the split and overlying the plate, said tab being resiliently urged away from the plate whereby the link may be removed through the split in said tubular member, and whereby said tab is moved against said plate by a slide disposed on said frame to thereby close said link retainer with said tab frictionally holding the slide in said frame.

2. In a slide carrier; a frame comprising a plate having a sight opening formed therethrough; a link retainer extending from each of the opposite end edges of said plate including a resilient substantially U-shaped member having one leg joined to the end edge of said plate and co-planar therewith, an offset locking tab extending from the other leg of said member and resiliently spaced from said plate to thereby provide for the removal of a link from said retainer; a recess formed in said plate adjacent each of the end edges for receiving said locking tabs when the latter are depressed for closing said link retainers; and guide means formed along each of the end edges of said plate adapted to slidably receive a slide and hold the latter against the plate whereby the plate will depress said locking tabs into said recesses, and the tabs will frictionally hold the slide in the frame.

3. In a slide carrier having a plurality of frames linked together in end to end relationship; a frame comprising a plate having a sight opening formed therein, a link retainer extending from each of the opposite ends of said plate including a resilient substantially U-shaped member for pivotally receiving a link and having one leg joined to the end edge of said plate and co-planar therewith, an offset locking tab extending from the other leg of said member overlying said plate and resiliently spaced therefrom to provide for the disengagement of the link from the retainer, and guide means formed along each of the end edges of said plate adapted to slidably receive a slide and depress the latter against the plate whereby the slide will urge said locking tab against said plate to close said link retainers, and said tabs will frictionally hold the slide against inadvertent removal from the frame.

4. In a slide carrier; a frame according to claim 3, wherein each of said plates is formed with a recess adjacent each of the end edges thereof adapted to receive said locking tabs when the latter are depressed by a slide in the frame whereby said locking tabs, when depressed will be flush with the surface of said plates.

5. In a slide carrier; a slide receiving frame comprising a pair of identical frame forming members; each of said members including a plate having a sight opening formed therethrough, a pair of longitudinally spaced apart flanges formed along one of the end edges of said plate, said flanges being inwardly bent at the top edges thereof to provide portions overhanging said plate, a depression formed in said plate between said spaced apart flanges adjacent said one end edge, and a substantially U-shaped link retainer extending from the other end edge of said plate, one leg of said retainer being substantially co-planar with said plate and the other leg of said retainer constituting a locking tab substantially co-planar with said overhanging portions of said flanges; one of said members being superposed on the other in inverted reversed relation thereto with said locking tab the link retainer on each member being received by said recess formed in the other member whereby a slide disposed between said frame forming members will have one end interposed between said locking tab of the link retainer on one member and said overhanging portions on the other member, and the other end of the slide will be interposed between said locking tab of the link retainer on said other member and said overhanging portions on said one member to thereby prevent separation of said members.

6. In a slide carrier; a slide receiving frame according to claim 5, wherein said locking tabs of said link retainers are resiliently bowed towards the plate from which the respective link retainer extends whereby said locking tabs of said link retainers will frictionally hold a slide in the frame.

7. In a slide carrier having a plurality of frames linked together in end to end relationship; a frame comprising a pair of spaced apart plates having aligned sight openings formed therein and adapted to receive a slide therebetween; an inwardly opening U-shaped link retaining member extending from an end edge of one of said plates; an identical link retaining member extending from the opposite end edge of the other of said plates; each of said plates being formed with a recess adapted to receive a locking tab portion of the link retaining member on the other plate; each of said plates being formed with spaced apart flanges on the end edge removed from the edge having the link retainer and on opposite sides of the respective recesses, said flanges being bent along the free edges to provide inwardly extending portions; said link retaining members being thereby adapted to pivotally receive closed links and being locked by a slide engaging in the open ends thereof and underlying the inwardly extending portions of said flanges.

8. In a slide carrier having a plurality of independent slide receiving frames linked together in end to end relationship; a frame including a pair of plates, a link receiving member at one end of said frame resiliently connecting the adjacent ends of said plates and urging said plates apart; a U-shaped inwardly opening link retaining member integral with the other end of one of said plates and including a locking tab on the free end thereof; slide retaining means on the other end of the other of said plates adapted to hold a slide against said other plates; said locking tab being adapted to overlie the other of said plates under the slide held on the latter to thereby frictionally hold the slide in the frame, and secure together said other ends of said plates.

9. In a slide carrier; a slide receiving frame comprising a pair of plates; a substantially U-shaped resilient link retainer having the legs thereof formed integral with the adjacent end edges of said plates and constantly urging said plates apart; a second substantially U-shaped inwardly opening link retaining member having a leg thereof formed integral with the opposite end edge of one of said plates; the other of said plates being formed with a depression adapted to receive the other locking tab forming leg of said second link retaining member when said plates are urged together; end wall portions formed on said other plate on opposite sides of said recess, and having inwardly directed flanges overhanging said other plate whereby a slide disposed between said plates will have one end interposed between said overhanging flanges and said locking tab of said second link retaining member to thereby secure said plates together and prevent removal of a link from said second link retaining member, and whereby said locking tab of said second link retaining member will be resiliently urged against the slide to frictionally hold the latter in the frame.

10. In a slide carrier having a plurality of frames linked together in end to end relationship; a frame comprising a body having channel defining means at its opposite ends to slidably receive a slide by movement of the latter into the body from a side thereof, link retaining members extending from each of said opposite ends, at least one of said link retaining members being of looped formation and including an edge tab portion free of said body to define an open space for engagement with a closed link and extending resiliently into the channel at the adjacent end of said body for frictional engagement with a face of a slide received in said channels to hold such slide in said body and to be closed by the slide.

11. In a slide carrier having a plurality of frames linked together in end to end relationship; a frame according to claim 10 wherein said body includes a plate having a sight opening formed therethrough, and each of said link retaining members is resilient and of substantially U-shaped configuration having one leg joined to the adjacent end edge of said plate and co-planar therewith, said tab portion extending and offset from the other leg of said member and resiliently spaced from said plate to thereby provide for the removal of a link from said retainer member, and wherein said channel defining means is adapted to hold the received slide against said plate so that the latter depresses said tab portions toward said plate to close the link retaining members.

12. In a slide carrier having a plurality of frames linked together in end to end relationship; a frame according to claim 11, wherein said plate is formed with a recess adjacent each of the end edges thereof adapted to receive said tab portions when the latter are depressed by the slide received in said channel defining means, so that said tab portions, when depressed, will be flush with the surface of said plate.

13. In a slide carrier having a plurality of frames linked together in end to end relationship; a frame according to claim 10 wherein said body includes a pair of identical body forming members, each of said body forming members including a plate having a sight opening formed therethrough, said channel defining means being formed by a pair of longitudinally spaced apart flanges formed along one end edge of each plate, said flanges being inwardly bent at the free edges to provide portions overhanging the related plate, a depression formed in each plate between said spaced apart flanges adjacent said one end edge of the plate, and wherein said link retaining members are each substantially U-shaped and extend from the other end edges of said plates, one leg of each retaining member being substantially co-planar with the related plate while the other leg of said retaining member constitutes a tab portion substantially co-planar with said overhanging portions of said flanges at the opposite end edge of the related plate, said plates being superposed in inverted, reversed relationship with said tab portion of each plate extending into said recess of the other of the plates whereby a slide disposed between said plates will have its opposite ends interposed between said overhanging portions of the flanges on one plate and said tab portion of the link retaining member on the other plate to thereby prevent separation of said members.

14. In a slide carrier having a plurality of frames linked together in end to end relationship; a frame according to claim 13, wherein each of said tab portions is resiliently bowed toward the plate from which the respective link retaining member extends.

15. In a slide carrier having a plurality of frames linked together in end to end relationship; a frame according to claim 10, wherein said body includes a pair of plates having sight openings formed therethrough, the other of said link retaining members being resilient and of substantially U-shaped configuration with the legs thereof formed integral with the adjacent end edges of said plates and constantly urging said plates apart, and said link retaining member of looped formation being formed integrally with the opposite end edge of one of said plates, and wherein a recess is formed in the opposite end edge portion of the other of said plates to receive said tab portion of the last mentioned link retaining member when said plates are urged together, and said channel defining means includes end wall portions formed on said other plate at opposite sides of said recess and having inwardly directed flanges overhanging said other plate whereby a slide disposed between said plates will have one end interposed between said overhanging flanges and said tab portion to thereby secure said plates together and prevent removal of a link from said one link retaining member.

HARTVIG OLSEN.

REFERENCES CITED

The following references are of record in the file of this patent:

UNITED STATES PATENTS

| Number | Name | Date |
|---|---|---|
| 1,590,704 | Semelroth | June 29, 1926 |
| 2,505,232 | Cristiani | Apr. 25, 1950 |